United States Patent
Takahashi et al.

(10) Patent No.: US 10,116,821 B2
(45) Date of Patent: Oct. 30, 2018

(54) IMAGE FORMING APPARATUS WHICH CAN REDUCE POWER CONSUMPTION

(71) Applicant: Konica Minolta, Inc., Chiyoda-ku, Tokyo (JP)

(72) Inventors: Kazusei Takahashi, Nishinomiya (JP); Kazuya Anezaki, Itami (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/826,865

(22) Filed: Nov. 30, 2017

(65) Prior Publication Data

US 2018/0160000 A1 Jun. 7, 2018

(30) Foreign Application Priority Data

Dec. 6, 2016 (JP) .................................. 2016-236686

(51) Int. Cl.
*H04N 1/00* (2006.01)
*G06F 9/48* (2006.01)

(52) U.S. Cl.
CPC ....... *H04N 1/00896* (2013.01); *G06F 9/4843* (2013.01); *H04N 1/00904* (2013.01); *H04N 2201/0094* (2013.01)

(58) Field of Classification Search
CPC .......... H04N 1/00896; H04N 1/00904; H04N 2201/0094; G06F 9/4843
USPC ....................................................... 358/1.14
See application file for complete search history.

(56) References Cited

U.S. PATENT DOCUMENTS

| | | | |
|---|---|---|---|
| 2004/0125399 A1* | 7/2004 | Kobayashi | G06F 1/3203 358/1.14 |
| 2007/0240159 A1* | 10/2007 | Sugiyama | H04N 1/00885 718/102 |
| 2012/0161514 A1* | 6/2012 | Choi | H02M 3/33561 307/17 |
| 2014/0078530 A1* | 3/2014 | Lee | G06F 21/608 358/1.13 |

FOREIGN PATENT DOCUMENTS

| | | |
|---|---|---|
| JP | 2007-324650 A | 12/2007 |
| JP | 2010-26768 A | 2/2010 |
| JP | 2011-199777 A | 10/2011 |

\* cited by examiner

*Primary Examiner* — Allen H Nguyen
(74) *Attorney, Agent, or Firm* — Buchanan Ingersoll & Rooney PC

(57) ABSTRACT

An image forming apparatus which can reduce power consumption is provided. A service hub as an image forming apparatus has a print engine unit to form images, a MFP (Multifunction Peripheral) circuit which includes a main CPU (Central Processing Unit) to control the print engine unit, a network interface circuit to perform communication with external devices, and a server circuit which includes a main CPU to control the network interface circuit. The MFP circuit and the server circuit have a common IP address. The server circuit further includes an electric power control unit to control electric power supply to the MFP circuit and electric power supply to the server circuit being independent of each other.

14 Claims, 7 Drawing Sheets

FIG. 4

| SUBJOB No. | CONTENTS OF PROCESSING | | ACCESS TO EXT. I/F | RELEGATE TO MFP C. |
|---|---|---|---|---|
| A-1 | COMMAND: get Time Stamp | | | NG |
| | Read from: ¥¥10.128.xx.xx¥work¥project_11¥document¥device_drivers¥* | | YES | |
| | Write to: /toSVHub-MFP/CMPandUPDATE/user A TimeStamps/ | | NONE | |
| A-2 | COMMAND: get Time Stamp | | | NG |
| | Read from: /RDheadquaters/development/project_11/soft-module/device_drivers/* (AREA MFP CANNOT ACCESS IN HDD) | | NONE | |
| | Write to: /toSVHub-MFP/CMP and UPDATE/Server TimeStamps/ | | NONE | |
| B | COMMAND: Compare | | | OK |
| | data1: /toSVHub-MFP/CMPandUPDATE/user A TimeStamps/* | | NONE | |
| | data2: /toSVHub-MFP/CMP and UPDATE/Server TimeStamps/* | | NONE | |
| | result data: /toSVHub-MFP/CMP and UPDATE/Update Target FILES/ | | | |
| C-1 | COMMAND: Update from DIR1 to DIR2 | | | NG |
| | file names: /toSVHub-MFP/CMP and UPDATE/Update Target FILES/ | | | |
| | DIR1: ¥¥10.128.xx.xx¥work¥project_11¥document¥device_drivers¥ | | YES | |
| | DIR2: RDheadquaters/development/project_11/soft-module/device_drivers/ | | NONE | |
| C-2 | COMMAND: Update from DIR2 to DIR1 | | | NG |
| | file names: /toSVHub-MFP/CMP and UPDATE/Update Target FILES/ | | | |
| | DIR2: /RDheadquaters/development/project_11/soft-module/device_drivers/ | | NONE | |
| | DIR1: ¥¥10.128.xx.xx¥work¥project_11¥document¥device_drivers¥ | | YES | |

IMAGE FORMING APPARATUS WHICH CAN REDUCE POWER CONSUMPTION

The present U.S. patent application claims a priority under the Paris Convention of Japanese patent application No. 2016-236686 filed on Dec. 6, 2016, including description, claims, drawings, and abstract the entire disclosure is incorporated herein by reference in its entirety.

BACKGROUND

Technological Field

This invention relates to an image forming apparatus and a control program for an image forming apparatus. More specifically, this invention relates to an image forming apparatus which can reduce power consumption and a control program for the image forming apparatus.

Description of the Related Art

As an electrophotography image forming apparatus, there are an MFP (Multi Function Peripheral) which has a scanner function, a facsimile function, a copying function, a function of a printer, a data transmitting function and a server function, a facsimile device, a copying machine, a printer, and so on. There is an image forming apparatus adopts conventional electrophotographic technology, working at an electrical power saving mode for keeping power consumption low.

Recently, the digitization of documents has progressed, and documents are often handled as digital data rather than paper. In offices, the importance of paper output printers and copy machines has declined. Importance of portable terminal devices such as smart phones and tablets for business use is increasing. In consequence, the needs of a server that communicates data with mobile terminal devices are increasing.

As a device providing a server function, an information processing apparatus equipped with both a hardware for an image forming apparatus and a hardware for a server (an information processing apparatus in which an image forming apparatus and a server are combined) is devised. Such the information processing apparatus is called as a service hub.

Techniques to attempt electrical power saving in an image forming apparatus are disclosed in the below Documents 1 to 3, for example. The below Document 1 discloses a print system which includes a plurality of printing devices, a plurality of host devices which share the plurality of printing devices, and a management server to administrate the printing devices and the host devices. The printing device works at an operation mode among a plurality of operation modes. The management server issues instructions to the printing device based on mode setting information, so that the printing device works at a mode among the plurality of operation modes.

The below Document 2 discloses an electric power supply control device equipped with an image process function execution unit for performing image process function of a plurality of types. The image process function execution unit independently or mutually selects one or more devices and cooperates with the devices, wherein the devices include a device with an electrical power saving mode having an electrical power saving mode control. The electrical power saving mode control is to energize a part of the device at electric power lower than normal time at least. The electric power supply control device is equipped with a switch unit, a switch control unit, and a continue unit. The switch unit supplies or turns off electric power to each of the plurality of devices. The switch control unit turns off the electric power supply to a device needed for performing an image process function, when there is no reception for issuing instructions to process the image process function even though a predetermined period elapsed for each image process function, and provides electric power to a device needed for performing an image process function at a time point when instructions to process the image process function is received and the processing details of the image process function is known, to control the switch unit. The continue unit continues to supply electric power to the device with the electrical power saving mode, to maintain at least the electrical power saving mode, when the device with the electrical power saving mode is unnecessary for processing the image process function on selecting a device based on the received processing details of the image process function, in a state in which electric power is being supplied to the device with the electrical power saving mode.

The below Document 3 discloses an image processing device in which an NIC (Network Interface Card) temporarily memorizes a job as a reserved job, when the job was received from an external device via the NIC in a sleep mode. The image processing device executes the reserved job by switching the required function blocks from "no energizing state" to "energizing state" by controlling energization of a sub electric power supply, when a predetermined execution initiation condition is satisfied. The image processing device transmits information relates to the reserved job, deletes the reserved job, or promptly executes processes for the reserved job by starting up of required function blocks in response to a request from external devices during the sleep mode.

[Document(s) related to patent(s)]
  [Document 1] Japan Patent Publication No. 2010-026768
  [Document 2] Japan Patent Publication No. 2011-199777
  [Document 3] Japan Patent Publication No. 2007-324650

FIG. 7 shows a block diagram indicating an example of a structure of a conventional service hub 1100. In FIG. 7, parts which relate to controls for various behavior of service hub 1100 (except for a control for the operation mode of service hub 1100) are indicated by arrows of solid lines, and parts which relate to controls for the operation mode of service hub 1100 are indicated by arrows of dotted lines.

Referring to FIG. 7, service hub 1100 is equipped with an MFP circuit (a controller circuit for a conventional type MFP) 1020, and a server circuit (a circuit for a conventional type server) 1030. Service hub 1100 has at least two operation modes which are a normal mode, and an electrical power saving mode in which the power consumption is smaller than the normal mode.

MFP circuit 1020 includes a main CPU (Central Processing Unit) 1021, a main memory 1022, a scanner unit and a print engine unit 1023, a HDD (Hard Disk Drive) 1024, an electric power supply IC (Integrated Circuit) 1041, an operation panel interface circuit 1042, a network interface circuit 1043, a facsimile interface circuit 1044, a sleep mode control circuit 1045, and an electric power supply control circuit 1046.

MFP circuit 1020 includes circuit domain CD1, and circuit domain CD2. Circuit domain CD1 is a part to which electric power is supplied at all times, regardless of the operation mode of service hub 1100. In circuit domain CD1, main memory 1022, electric power supply IC 1041, operation panel interface circuit 1042, network interface circuit 1043, facsimile interface circuit 1044, sleep mode control circuit 1045, and electric power supply control circuit 1046 are placed. Circuit domain CD2 is a part to which electric power is not supplied when the operation mode of service hub 1100 is an electrical power saving mode. In circuit domain CD2, main CPU 1021, scanner unit and print engine unit 1023, and HDD 1024 are placed.

Main CPU 1021 controls the behavior of MFP circuit 1020.

Main memory 1022 is used for temporarily storing data required when main CPU 1021 executes various programs.

Scanner unit and print engine unit 1023 performs reading behavior and printing behavior for images under control of main CPU 1021. Scanner unit and print engine unit 1023 include an ASIC (Application Specific Integrated Circuit).

HDD 1024 stores various information.

Electric power supply IC 1041 provides electric power to MFP circuit 1020 under control of electric power supply control circuit 1046.

Operation panel interface circuit 1042 controls an operation panel which displays various information and receives various operation.

Network interface circuit 1043 performs communication regarding to MFP circuit 1020 with external devices.

Facsimile interface circuit 1044 transmits and receives facsimiles.

Sleep mode control circuit 1045 controls the operation mode of service hub 1100 by transmitting signals to electric power supply control circuit 1046, based on signals received from each of operation panel interface circuit 1042, network interface circuit 1043, and facsimile interface circuit 1044.

Electric power supply control circuit 1046 turns electric power which power supply IC 1041 provides to circuit domain CD2 on or off, based on signals received from sleep mode control circuit 1045. More specifically, electric power supply control circuit 1046 starts suppling electric power to circuit domain CD2 when the operation mode of service hub 1100 moves from the electrical power saving mode to the normal mode, and shuts off supply of electric power to circuit domain CD2 when the operation mode of service hub 1100 moves to the electrical power saving mode.

Server circuit 1030 includes CPU 1031, main memory 1032, electric power supply IC 1033, HDD 1034, and network interface circuit 1035. Server circuit 1030 is a part to which electric power is supplied at all times, regardless of the operation mode of service hub 100.

Main CPU 1031 controls the behavior of server circuit 1030.

Main memory 1032 is used for temporarily storing data required when main CPU 1031 executes various programs, for example.

Electric power supply IC 1033 provides electric power to server circuit 1030.

HDD 1034 stores various information.

Network interface circuit 1035 performs communication regarding to server circuit 1030 with external devices.

It was difficult to reduce the power consumption of the above mentioned service hub 1100.

The image forming apparatus (a part which corresponds to MFP circuit 1020) typically moves the operation mode from the normal mode to the electrical power saving mode, when the non-operating time continues for more than a certain period of time. The image forming apparatus restores the operation mode to the normal mode, when the necessity of operation occurs. Herewith, reduction of power consumption can be attempted.

On the other hand, a server (a part which corresponds to server circuit 1030) which has a dedicated hardware is required to process communications in an extremely short time, wherein the communications abundantly occur from the outside at unexpected timing. Therefore, a server generally does not move to an electrical power saving mode, and is generally energized at all times. (It is not assumed that the server performs a server function by installing a software in the image forming apparatus).

Therefore, service hub 1100 in which an image forming apparatus and a server are simply combined has a lot of parts being energized at all times, so that power consumption can not be reduced.

Hence, one idea is that an electric power supply control circuit for controlling electric power provided to the image forming apparatus part is installed on the image forming apparatus part, and an electric power supply control circuit for controlling electric power provided to the server part is installed on the server part. However, according to this method, electric power should be provided to both the electric power supply control circuit in the image forming apparatus part and the electric power supply control circuit in the server part, at all times. Therefore, since the circuit is redundant, it leads to extra power consumption.

SUMMARY

This invention is to solve the above problems. The object is to provide an image forming apparatus which can reduce power consumption and a control program for the image forming apparatus.

To achieve at least one of the abovementioned objects, according to an aspect of the present invention, an image forming apparatus reflecting one aspect of the present invention comprises a hardware circuit for image forming, which includes an image forming unit to form images and an image forming control unit to control the image forming unit, and a hardware circuit for communication, which includes a communication unit to perform communication with external devices and a communication control unit to control the communication unit, wherein both the circuit for image forming and the circuit for communication have a common IP (Internet Protocol) address as an IP address published to users of the image forming apparatus, and the circuit for communication further includes an electric power control unit to control electric power supply to the circuit for image forming and electric power supply to the circuit for communication, being independent of each other.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 4 schematically shows a figure of a job list in which the job to be executed by main CPU 31 was expanded to sub jobs.

DETAILED DESCRIPTION OF EMBODIMENTS

Hereinafter, one or more embodiments of the present invention will be described with reference to the drawings. However, the scope of the invention is not limited to the disclosed embodiments. In the followings, the embodiment of this invention will be explained based on the Figures. In the followings, the embodiment of this invention will be explained based on the Figures.

In the following embodiments, a case that the image forming apparatus is an MFP will be explained. The image forming apparatus may be a facsimile device, a copying machine, a printer, or the like, other than an MFP.

[The Structure of the Image Forming Apparatus]

Firstly, the structure of the image forming apparatus according to the embodiment will be explained.

Figure 1:
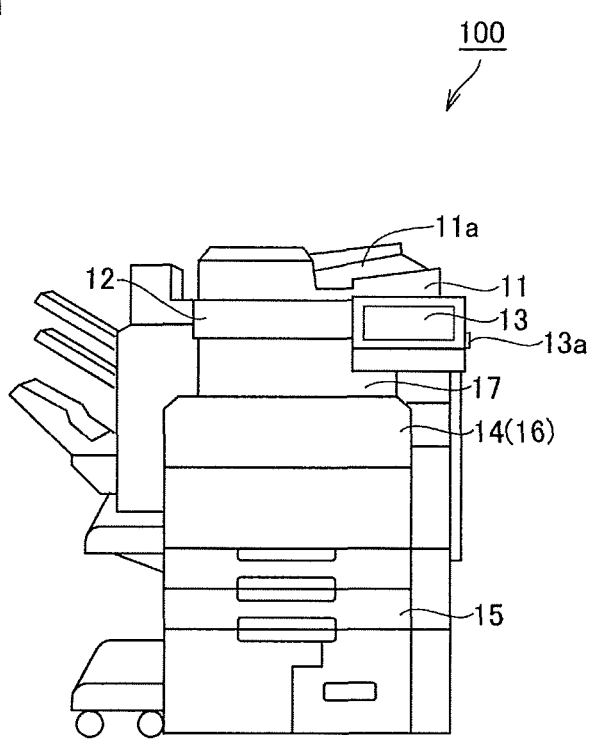
FIG. 1 schematically shows a figure of an appearance of service hub 100, according to the embodiment of this invention.

FIG. 1 schematically shows a figure of an appearance of service hub 100, according to the embodiment of this invention.

Referring to FIG. 1, the image forming apparatus according to the embodiment is an MFP referred to as a service hub. The service hub 100 is equipped with an ADF (Auto Document Feeder) unit 11, a scanner unit 12, an operation panel 13, a print engine unit 14, a paper feeding cartridge unit 15, and so on.

ADF unit 11 is provided at an upper part of service hub 100. ADF unit 11 feeds documents stacked on document tray 11a to an image reading location of scanner unit 12.

Scanner unit 12 is provided below the ADF unit 11. Scanner unit 12 reads the document images.

Operation panel 13 displays various information, and receives various operations. Operation panel 13 includes a connection interface 13a (a USB (Universal Serial Bus) terminal) which is a hardware interface for connecting an external device (an USB memory or the like) to service hub 100.

Print engine unit 14 (an example of the image forming unit) is placed under the scanner unit 12, and provided above paper feeding cartridge unit 15. Print engine unit 14 forms images on sheets or the like, based on image data. Print engine unit 14 is roughly configured with a toner image forming unit, a fixing device, a sheet conveying unit, and so on. Print engine unit 14 forms an image on the sheet by electrophotographic technology, for example. The toner image forming unit forms an image on the sheet. The toner image forming unit is configured with a developing device for developing toner images, photo conductors on which toner images are formed, a transfer unit for transferring images from the photo conductors to a sheet, and so on. The fixing device includes a heating roller and a pressure roller. The fixing device pinches and conveys a sheet on which a toner image was formed, by the heating roller and the pressure roller, to heat and apply pressure on the sheet. Herewith, the fixing device melts the toner adhered to the sheet to fix it on the sheet, and forms an image on the sheet. The sheet conveying unit feeds a paper sheet from paper feeding cartridge unit 15, and conveys the sheet in the inner part of the chassis of the service hub 100. The sheet conveying unit discharges the sheets on which images were formed, from the chassis of service hub 100 to copy receiving tray 17 or the like.

A cover 16 is provided on the front face of service hub 100, at a location where print engine unit 14 is provided. By the cover 16, a state in which the inner part of the chassis of service hub 100 is exposed and a state in which the inner part of the chassis of service hub 100 is covered are realized. A user of service hub 100 can resolve jam occurred at print engine unit 14, by changing the state to the state in which cover 16 is opened.

Paper feeding cartridge unit 15 is provided at the lower part of service hub 100. Paper feeding cartridge unit 15 stores sheets to be printed.

Figure 2:
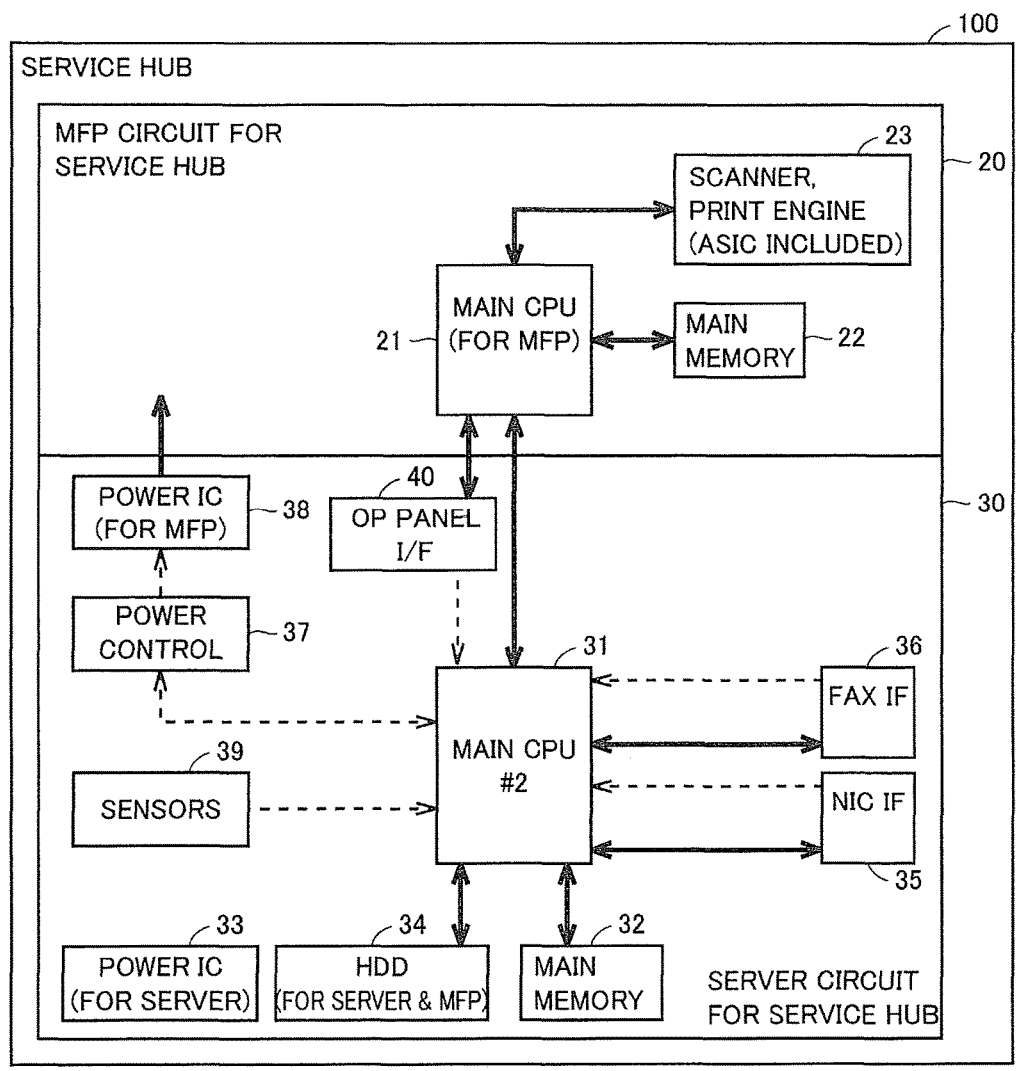
FIG. 2 shows a block diagram indicating an example of a structure of the service hub 100, according to the embodiment of this invention.

FIG. 2 shows a block diagram indicating an example of a structure of the service hub 100, according to the embodiment of this invention. In FIG. 2, parts related to controls of various behavior of service hub 100 (except for controls of the operation mode of service hub 100) are indicated by arrows of solid lines. Parts related to the controls of the operation mode of service hub 100 are indicated by arrows of dotted lines.

Referring to FIG. 2, service hub 100 is equipped with an MFP circuit (an MFP circuit for a service hub) 20 (an example of a circuit for image forming) which is a hardware to achieve image forming function, and a server circuit (a server circuit for a service hub) 30 (an example of a circuit for communication) which is a hardware to achieve a server function. As an IP address disclosed to users of service hub 100, MFP circuit 20 and server circuit 30 have a common IP address. MFP circuit 20 and server circuit 30 are stored in the inner part of the chassis of service hub 100.

As an operation mode showing the providing state of electric power, service hub 100 has a normal mode (an example of a first mode), and an electrical power saving mode (an example of a second mode) in which power consumption is smaller than the normal mode, at least. The providing states of electric power to MFP circuit 20 in the normal mode and the electrical power saving mode are different from each other. More specifically, electric power supplied to MFP circuit 20 in a state in which the operation mode of service hub 100 is the normal mode is lower than electric power supplied to MFP circuit 20 in a state in which the operation mode of service hub 100 is the electrical power saving mode. On the other hand, electric power supplied to server circuit 30 does not change in the normal mode and the electrical power saving mode.

MFP circuit 20 includes a main CPU 21 (an example of an image forming control unit), a main memory 22, and a scanner unit and a print engine unit 23.

Main CPU 21 controls entire behavior of MFP circuit 20 which includes print engine unit 14.

Main memory 22 is used for temporarily storing data required when main CPU 21 executes various programs, for example.

Scanner unit and print engine unit 23 is parts which correspond to scanner unit 12 and print engine unit 14 in FIG. 1. Scanner unit and print engine unit 23 includes an ASIC.

Server circuit 30 includes a main CPU 31 (an example of a communication control unit), a main memory 32, an electric power supply IC 33, a HDD 34 (an example of a subsidiary storage device), a network interface circuit 35 (an example of a communication unit), a facsimile interface circuit 36, an electric power supply control unit 37, an electric power supply IC 38, various sensors 39, and an operation panel interface circuit 40. Main CPU 31 and electric power supply control unit 37 constitutes an electric power control unit.

Main CPU 31 controls entire behavior of server circuit 30 which includes network interface circuit 35 and facsimile interface circuit 36.

Main memory 32 is used for temporarily storing data required when main CPU 31 executes various programs, for example.

Electric power supply IC 33 provides electric power at all times to server circuit 30, regardless of the operation mode of service hub 100.

HDD 34 stores various information, such as control programs required for behavior of main CPUs 21 and 31, and job data.

Network interface circuit 35 performs communication with external devices.

Facsimile interface circuit 36 transmits and receives facsimile.

Electric power supply control unit 37 controls the electric power supply to MFP circuit 20 and the electric power supply to server circuit 30 which are independent of each other, under control of CPU 31. More specifically, electric power supply control unit 37 starts the electric power supply to MFP circuit 20 when the operation mode of service hub 100 moves from the electrical power saving mode to the normal mode, and reduces or shuts off the electric power supply to MFP circuit 20 when the operation mode of service hub 100 moves to the electrical power saving mode.

Electric power supply IC 38 provides electric power to MFP circuit 20, under control of electric power supply control unit 37. Electric power supply IC 38 may supply electric power to each of elements included in MFP circuit 20 at a plurality of electrical voltages which are different from each other.

Various sensors 39 detect opening and closing of cover 16, and arrangement of a document to be read on document tray 11a of ADF unit 11.

Operation panel interface circuit 40 performs various display behavior on operation panel 13, and detects operations on operation panel 13 and connection of an external device to connection interface 13a.

[Details of Control Behavior of the Image Forming Apparatus]

Next, the control behavior of the operation mode according to the image forming apparatus of the embodiment will be explained. Hereinafter, behavior examples of items (1) to (6) will be explained.

(1) In at least one of the case when MFP circuit 20 does not work during a required time and the case when MFP circuit 20 does not receive the operation request during a required time in a state in which the operation mode of service hub 100 is the normal mode, main CPU 31 reduces electric power provided from electric power supply IC 38 to MFP circuit 20 via electric power supply control unit 37. Herewith, the operation mode of service hub 100 is moved from the normal mode to the electrical power saving mode.

Service hub 100 may have a sleep mode and an electric power supply off mode, as electrical power saving modes. The sleep mode is an operation mode in which electric power lower than electric power which is provided in the normal mode is supplied from electric power supply IC 38 to MFP circuit 20 (to provide electric power to only a part of elements of MFP circuit 20). The electric power supply off mode is a mode in which electric power provided from electric power supply IC 38 to MFP circuit 20 is completely shut off.

When service hub 100 has the sleep mode and the electric power supply off mode as electrical power saving modes, service hub 100 may beforehand accept a configuration to select the sleep mode or the electric power supply off mode as the electrical power saving mode adopted. Service hub 100 may configure the sleep mode and the electric power supply off mode stepwise, in response to the usage state of service hub 100. Service hub 100 may beforehand accept a configuration for time period from when a certain period or more of time in which there is not a job executed by MFP circuit 20 elapses to when electric power provided from electric power supply IC 38 to MFP circuit 20 is completely shut off, in a case in which the electric power supply off mode is adopted as the electrical power saving mode.

The default operation mode of service hub 100 may be the electric power supply off mode. In this case, electric power is not supplied to MFP circuit 20 in the default state (a state in which there is not a job), so that MFP circuit 20 does not start up. In consequence, service hub 100 does not perform behavior in which "electric power provided to the MFP circuit decreases (entering the sleep state) when a user does not use service hub 100", and performs behavior in which "electric power is provided to the MFP circuit only when a user uses service hub 100", so that electric power of MFP circuit 20 can be reduced to the utmost limit.

In the embodiment, MFP circuit 20 and server circuit 30 have a common IP address. Therefore, network interface circuit 35 and facsimile interface circuit 36 perform both the communication related to image forming (communication relevant to the behavior of MFP circuit 20) and the communication related to the server (communication relevant to the behavior of server circuit 30). Network interface circuit 35 and facsimile interface circuit 36 are installed in server circuit 30, not in MFP circuit 20. HDD 34 stores both data related to image forming (data relevant to the behavior of MFP circuit 20 (such as box data)) and data related to communication (data relevant to the behavior of server circuit 30). HDD 34 is also installed in server circuit 30, not in MFP circuit 20. According to this structure, server circuit 30 receives facsimile data and print data transmitted from external devices under control of main CPU 31, regardless of whether the operation mode of service hub 100 is the normal mode or the electrical power saving mode.

(2) When main CPU 31 receives data relevant to the behavior of MFP circuit 20 such as facsimile data and print data transmitted from external devices in a state in which the operation mode of service hub 100 is the electrical power saving mode, CPU 31 stores the received data into a storing area in HDD 34 which main CPU 21 can access.

In this instance, main CPU 31 may restore the operation mode from the electrical power saving mode to the normal mode, by immediately increasing electric power supply or beginning electric power supply to MFP circuit 20 via electric power supply control unit 37, to perform printing based on the facsimile data or print data.

Main CPU 31 may not transmit a restore request to electric power supply control unit 37. Further, main CPU 31 restores the operation mode from the electrical power saving mode to the normal mode, to perform printing based on facsimile data or print data, by transmitting the restore request to electric power supply control unit 37 at a necessary timing, in a method using a timer, for example.

Further, main CPU 31 may restore the operation mode from the electrical power saving mode to the normal mode by transmitting the restore request to electric power supply control unit 37, to perform printing based on facsimile data or print data, when an operation for restoring to the normal mode is received from a user via operation panel 13.

(3) When main CPU 31 transmits data stored in HDD 34 to an external device by using network interface circuit 35 in accordance with a request from the external device in a state in which the operation mode of service hub 100 is the electrical power saving mode, main CPU 31 does not transmit the restore request to electric power supply control unit 37. Herewith, data transmitting can be executed, even if the operation mode is the electrical power saving mode.

(4) The data relevant to the behavior of MFP circuit 20 and the data relevant to the behavior of server circuit 30 are stored in HDD 34. HDD 34 is installed on server circuit 30. Main CPU 31 stores data into HDD 34, and reads data stored in HDD 34.

When main CPU 21 should store data in HDD 34, main CPU 21 transmits data which should be stored in HDD 34 to main CPU 31. Main CPU 31 stores data received from main CPU 21 in HDD 34. When the data storing was completed in a normal way, main CPU 31 transmits a completion notice for the storing to main CPU 21. When the data storing can not be completed in a normal way, main CPU 31 transmits a storing error notice to main CPU 21.

When main CPU 21 should acquire data stored in HDD 34, main CPU 21 requests main CPU 31 to transmit the data. When main CPU 31 receives the data transmitting request from main CPU 21, main CPU 31 reads the requested data from HDD 34 and transits it to main CPU 21. When the data transmitting can not be completed in a normal way, main CPU 31 transmits a transmitting error notice to main CPU 21.

(5) Operation panel interface circuit 40 is basically controlled by main CPU 21. On the other hand, parts relevant to the operation mode (signals from switches of operation panel 13, and detection signals of external media connected) in operation panel interface circuit 40 is connected to main CPU 31.

Main CPU 31 requests electric power supply control unit 37 to change the operation mode as needed basis, based on signals received from various sensors 39 and operation panel interface circuit 40. Especially, main CPU 31 preferably restores the operation mode of service hub 100 from the electrical power saving mode to the normal mode, in at least one of the case when an operation on operation panel 13 was detected, the case when opening or closing of cover 16 was detected, the case when an external device was connected to connection interface 13a, and the case when a document to be read was arranged on document tray 11a, in the state in which the operation mode of service hub 100 is in the electrical power saving mode.

(6) Main CPU 31 may restore the operation mode from the electrical power saving mode to the normal mode and make MFP circuit 20 (main CPU 21) execute a part of jobs to be executed by main CPU 31, when the load of jobs for which the main CPU 31 itself is responsible becomes more than or equal to a predetermined amount, in the state in which the operation mode of service hub 100 is the electrical power saving mode. More specifically, main CPU 31 transmits the restore request to electric power supply control unit 37, and determines processes to be relegated to MFP circuit 20 among jobs to be executed by main CPU 31, when the load of jobs for which the CPU itself is responsible becomes more than or equal to a predetermined amount, in the state in which the operation mode of service hub 100 is the electrical power saving mode.

Main CPU 31 makes a job list in which jobs for which the CPU itself is responsible were expanded to sub jobs, and determines the presence or absence of the access to an external interface for each of the sub jobs. Main CPU 31 eliminates front-end processes and back-end processes which need accesses to the external interface from objects to be relegated, and makes inner part processes for which an access to the external interface is unnecessary (mid processing) (processes other than front-end processes and back-end processes) objects to be relegated.

Figure 3:
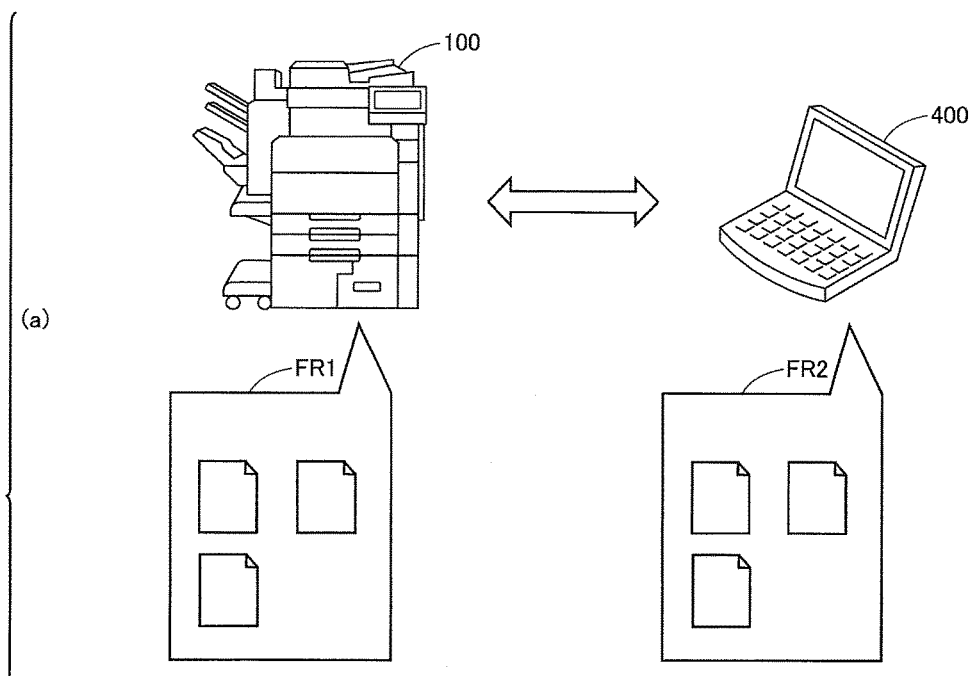
FIG. 3 shows an example of a job to be executed by main CPU 31.

FIG. 3 shows an example of a job to be executed by main CPU 31. FIG. 3 (a) ideally shows a job to be executed by main CPU 31. FIG. 3 (b) shows the contents of a job to be executed by main CPU 31.

Referring to FIG. 3, a case in which MFP circuit 20 performs a part of a job (a file synchronization job) which synchronizes files stored in folder FR1 of HDD 34 in service hub 100 with files stored in folder FR2 of a HDD in user PC 400 as an external device will be explained. Service hub 100 is named "SV-HUB3", and the location of folder FR1 shall be "/RDheadquaters/development/project_11/soft-module/device_drivers". The name of user PC 400 is "user A PC", the IP address is "10.128.xx.xx", and the location of folder FR2 shall be "C¥work ¥project_11 ¥document ¥device_drivers".

FIG. 4 schematically shows a figure of a job list in which the job to be executed by main CPU 31 was expanded to sub jobs.

Referring to FIG. 4, main CPU 31 resolves the file synchronization job into the following sub jobs A, B, and C.

Sub job A, which is a process to acquire file information of data and time stamp information in user PC 400.

Sub job B, which is a process to compare and verify the acquired information of the user PC 400 side, with information of the service hub 100 side.

Sub job C, which is a process to transmit and receive files to be updated, with user PC 400.

Sub jobs A-1 and A-2 belong to sub job A. Subjob A-1 is a process to acquire information of time stamps of files at the side of user PC 400. Sub job A-2 is a process to acquire information of time stamps of files at the side of service hub 100. Sub jobs C-1 and C-2 belong to sub job C. Sub job C-1 is a process to update files in user PC 400, to make the contents of the files same as the contents of files in service hub 100. Sub job C-2 is a process to update files in service hub 100, to make the contents of the files same as the contents of files in user PC 400.

Since sub jobs A and C are processes accompanied by communication with user PC 400, MFP circuit 20 can not execute them. Therefore, sub jobs A and C are excluded from objects to be relegated, and sub jobs A and C are handled by main CPU 31 installed in a circuit same as network interface circuit 35.

On the other hand, since sub job B is a process without communication with user PC 400, MFP circuit 20 can execute it. Therefore, sub job B is regarded as an object to be relegated, and main CPU 21 handles it.

Referring to FIG. 2, when electric power supply control unit 37 receives the restore request from main CPU 31, electric power supply control unit 37 restores the operation mode (moves to) the normal mode, by increasing or starting the electric power supply by electric power supply IC 38 to MFP circuit 20.

Upon confirming the startup of MFP circuit 20, main CPU 31 relegates processes which was determined as objects to be relegated (sub job B, in this embodiment) to MFP circuit 20, and requests the processing.

Main CPU 21 in MFP circuit 20 executes the processes relegated from main CPU 31, and transmits a completion notice of the processes and data which is the resultant by the processes to main CPU 31.

When main CPU 31 receives the completion notice of the processes and the data which is the resultant by the processes from MFP circuit 20, main CPU 31 moves the operation mode of service hub 100 to the electrical power saving mode, via electric power supply control unit 37.

HDD 34 is installed on server circuit 30, and shared by MFP circuit 20 and server circuit 30. To avoid a situation in which the data stored in HDD 34 relevant to server circuit 30 are freely modified, copied, and erased by a public user who is allowed to use the image forming function of service hub 100, it is preferable that the storing area of HDD 34 is divided into a plurality of areas such as a data area for the MFP circuit (which can not be accessed by main CPU 31), a data area for the server circuit (which can not be accessed by main CPU 21), and a shared area (which can be accessed by main CPUs 21 and 31), to restrict access to each of the areas as needed basis. In this instance, data which relates to sub jobs as objects to be relegated are stored in the shared area.

When sub job data as objects to be relegated is stored in the data area for the server circuit and main CPU 21 can not access it, main CPU 31 may copy or move the data to the data area for the MFP circuit or the shared area.

When main CPU 31 copied or moved the sub job data as objects to be relegated, to the data area for the MFP circuit or the shared area, MFP circuit 20 completed the relegated process, and main CPU 31 received the resultant data from MFP circuit 20 (or main CPU 31 read the resultant data from HDD 34), main CPU 31 preferably deletes the copied or moved data to the data area for the MFP circuit or the shared area.

[The Flowchart of Control Behavior of the Image Forming Apparatus]

Next, a flowchart showing the control behavior of the operation mode of the image forming apparatus according to the embodiment will be explained.

Figure 5:
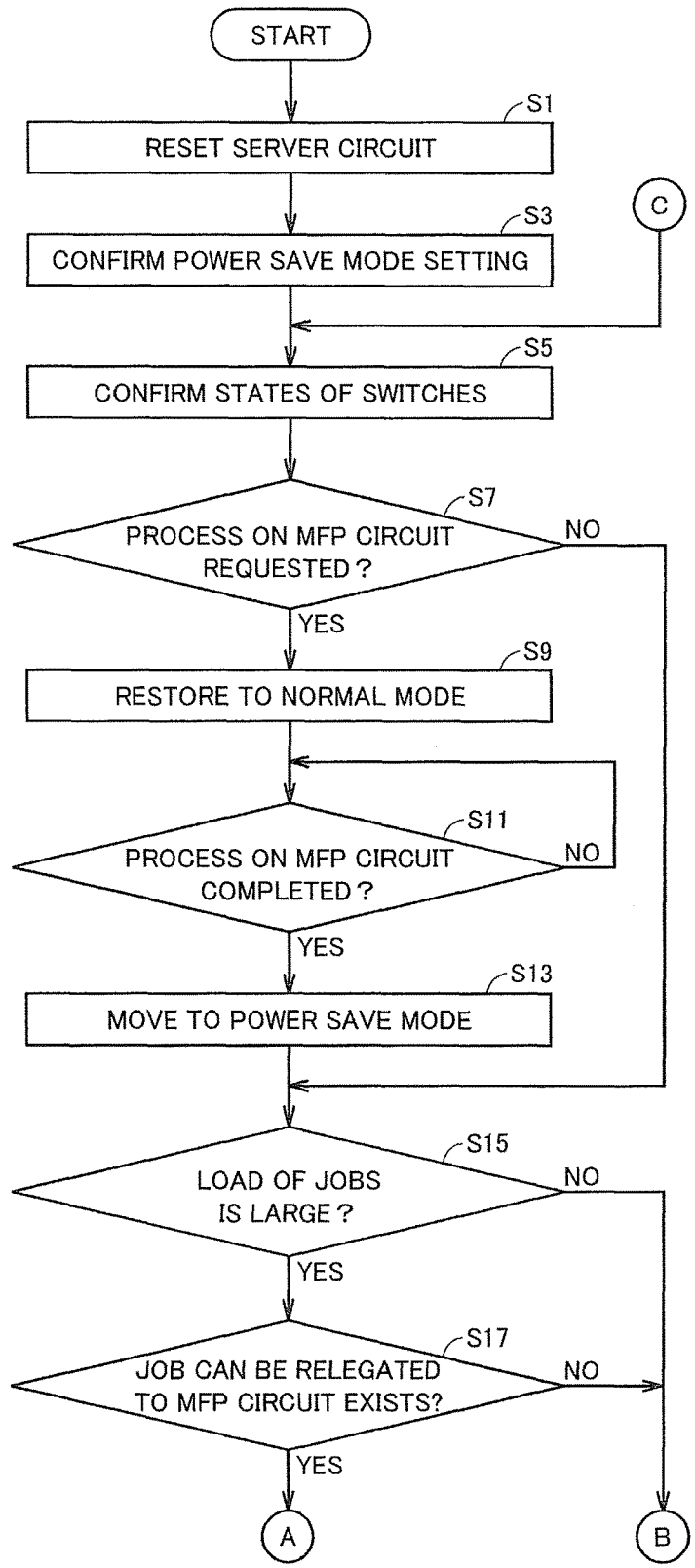
FIG. 5 shows the first part of a flowchart indicating control behavior of the operation mode, according to service hub 100 in the embodiment of this invention.
Figure 6:
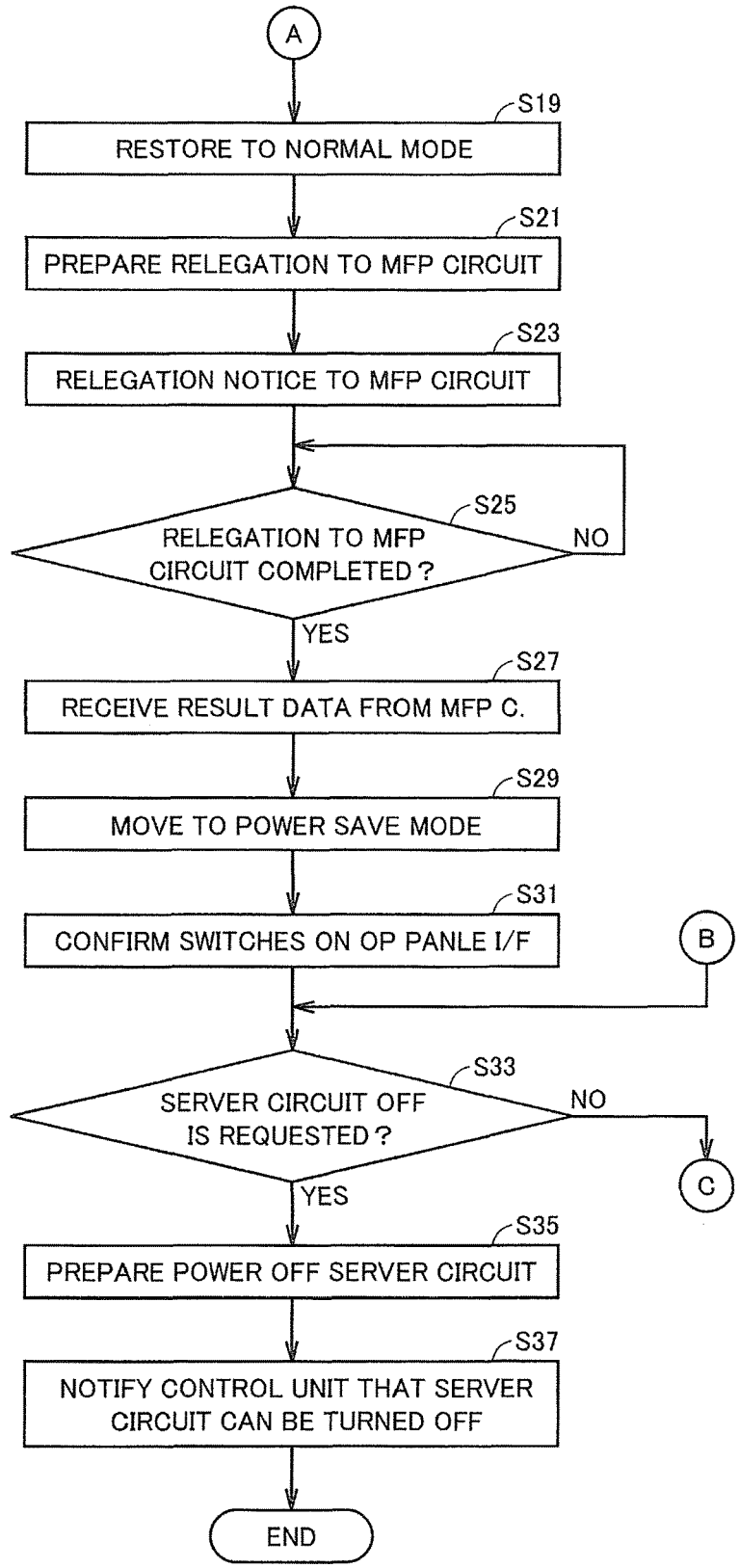
FIG. 6 shows the second part of the flowchart indicating control behavior of the operation mode, according to service hub 100 in the embodiment of this invention.
Figure 7:
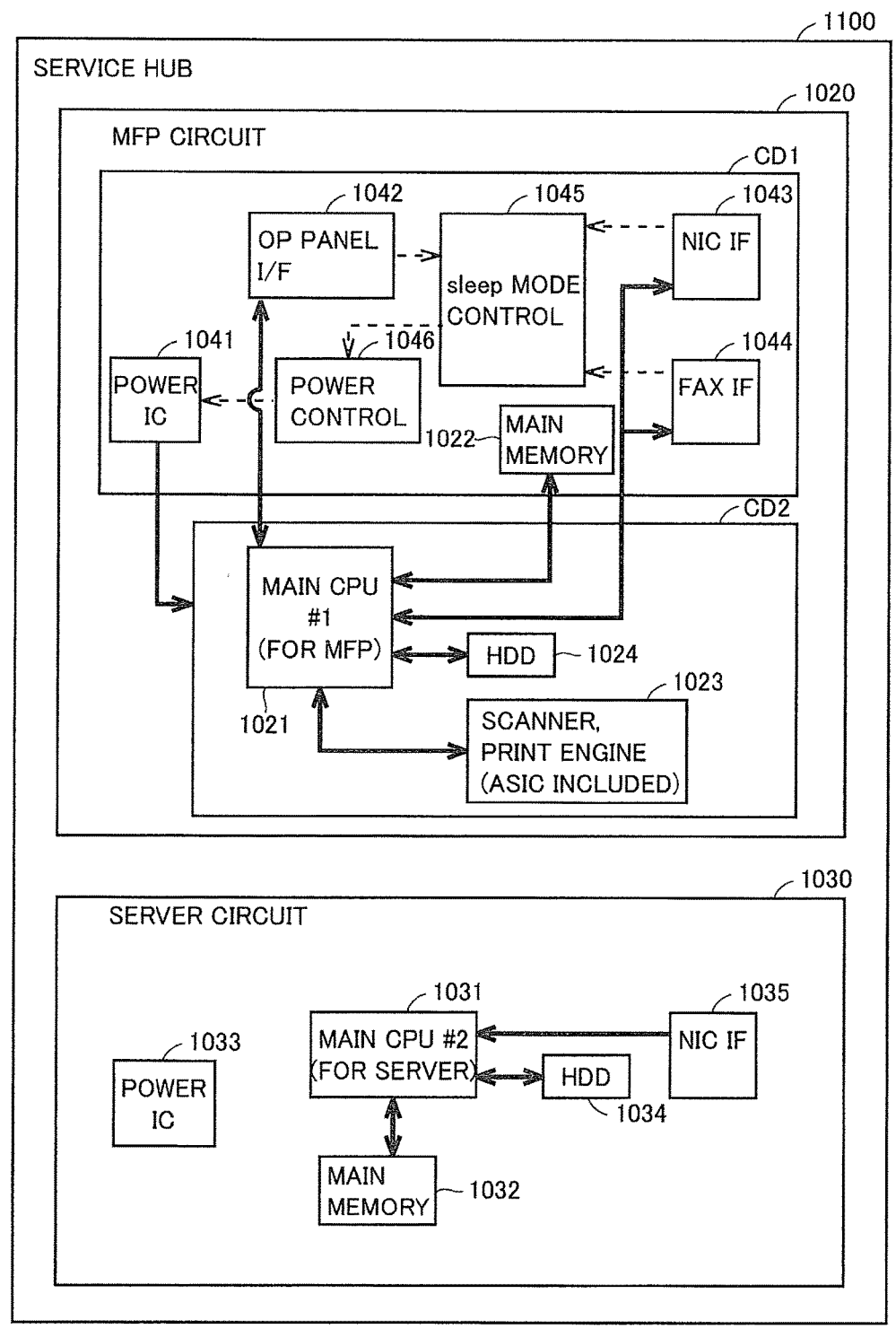
FIG. 7 shows a block diagram indicating an example of a structure of a conventional service hub 1100.

FIGS. 5 and 6 show a flowchart indicating control behavior of the operation mode, according to service hub 100 in the embodiment of this invention. In this embodiment, a case in which the default operation mode of service hub 100 is the electric power supply off mode (an electrical power saving mode in which electric power is not supplied to MFP circuit 20) will be explained.

Referring to FIG. 5, when electric power supply to service hub 100 (electric power supply to the server circuit 30 side) is turned on, main CPU 31 executes the reset process for server circuit 30 (S1). The reset process includes an initialization configuration process. Next, main CPU 31 confirms which of the sleep mode and the electric power supply off mode is being adopted as the electrical power saving mode (the setting of the electrical power saving mode) (S3). Next, main CPU 31 confirms signals from various sensors 39 and operation panel interface circuit 40 (states of various switches) (S5), and determines whether a process on MFP circuit 20 is requested or not (S7).

At step S7, when it is determined that a process on MFP circuit 20 is requested (YES at S7), main CPU 31 restores the operation mode of service hub 100 to the normal mode by providing electric power to MFP circuit 20 (S9). The process which restores the operation mode to the normal mode according to steps S5 to S9 may be a process by an interrupt notification.

Next, main CPU 31 determines whether the process of MFP circuit 20 is completed or not (S11). At step S1, until it is determined that the process of MFP circuit 20 is completed, main CPU 31 continues the process of step S11.

At step S11, when it is determined that the process of MFP circuit 20 is completed (YES at S11), main CPU 31 moves the operation mode of service hub 100 to the electrical power saving mode by shutting off electric power provided to MFP circuit 20 (S13), and steps in the process of step S15.

At step S7, when it is determined that a process on MFP circuit 20 is not requested (NO at S7), main CPU 31 steps in the process of step S15.

At step S15, main CPU 31 determines whether the load of jobs for which the CPU itself is responsible is more than or equal to a predetermined amount; or not (S15).

At step S15, when it is determined that the load of jobs for which the CPU itself is responsible is more than or equal to the predetermined amount (YES at S15), main CPU 31 determines whether there is a process which can be relegated to MFP circuit 20 among the job, or not (S17). The process which can be relegated to MFP circuit 20 is a process without communication with an external device.

At step S17, when it is determined that there is a process which can be relegated to MFP circuit 20 (YES at S17), main CPU 31 steps in the process of step S19 in FIG. 6.

At step S15, when it is determined that the load of jobs for which the CPU itself is responsible is not more than or equal to the predetermined amount (NO at S15), or at step S17, when it is determined that there is not a process which can be relegated to MFP circuit 20 (NO at S17), main CPU 31 steps in the process of step S33 in FIG. 6.

Referring to FIG. 6, at step S19, main CPU 31 restores the operation mode of service hub 100 to the normal mode, by providing electric power to MFP circuit 20 (S19). Next, main CPU 31 performs the job relegation preparation process for MFP circuit 20 (S21), and performs the job relegation notification process to MFP circuit 20 (S23).

The job relegation preparation process to MFP circuit 20 includes a process for preparing a job list in which the job is expanded to sub jobs, and a process for preparing the sub job data as objects to be relegated (a process to copy or move the sub job data as objects to be relegated to a predetermined area in HDD 34).

The job relegation notification process to MFP circuit 20 includes a process for informing a storage location of the sub job data as objects to be relegated to MFP circuit 20, a process for transmitting the job list, a process for transmitting a request to start the execution of the relegated process, and so on.

Next, main CPU 31 determines whether the relegation process by MFP circuit 20 was completed or not (S25). This determination is performed based on the completion notice from main CPU 21 in MFP circuit 20. Until it is determined that the relegation process by MFP circuit 20 was completed, main CPU 31 continues the process of step S25.

At step S25, when it is determined that the relegation process by MFP circuit 20 was completed (YES at S25), main CPU 31 receives acquired data by the result of the relegation process, from MFP circuit 20 (S27). At step S27, main CPU 31 deletes the sub job data as objects to be relegated in HDD 34, as needed basis.

Next, main CPU 31 moves the operation mode of service hub 100 to the electrical power saving mode, by shutting off electric power provided to MFP circuit 20 (S29). Next, main CPU 31 confirms signals from operation panel interface circuit 40 (the switch states) (S31), and determines whether the electric power supply off to server circuit 30 was requested by the operation of the user, or not (S33).

At step S33, when it is determined that electric power supply off to server circuit 30 was not requested by the operation of the user (NO at S33), main CPU 31 steps in the process of step S5 in FIG. 5.

At step S33, when it is determined that electric power supply off to server circuit 30 was requested by the operation of the user (YES at S33), main CPU 31 executes the preparation process for electric power supply off for server circuit 30 (S35).

The preparation process for electric power supply off for server circuit 30 is performed after waiting for the completion of all the jobs being processed. The preparation process for electric power supply off for server circuit 30 includes an evacuation process for data temporarily stored in main memory 32, and so on.

Next, main CPU 31 notifies electric power supply control unit 37 that electric power supply off to server circuit 30 is available, and terminates the process (S37). When electric power supply control unit 37 receives this notification, electric power supply control unit 37 shuts off electric power from electric power supply IC 33 to server circuit 30. The shutting off process for electric power to server circuit 30 according to steps S31 to S37 may be a process by an interrupt notification.

The Effect of the Embodiment

According to the above mentioned embodiment, main CPU 31 and electric power supply control unit 37 which are parts to control the electric power supply to MFP circuit 20 are installed on server circuit 30 side which are energized at all times, regardless of the operation mode of service hub 100. Therefore, power consumption at MFP circuit 20 side can be reduced, when the operation mode is the electrical power saving mode.

Signals from various sensors 39 and operation panel interface circuit 40 which are triggers to restore the operation mode to the normal mode, are detected by main CPU 31 at the server circuit 30 side. Communication related to image forming (communication which is relevant to the behavior of MFP circuit 20) is performed by network interface circuit 35 and facsimile interface circuit 36 at the server circuit 30 side. Hence, service hub 100 can perform communication related to image forming, while the operation mode is set to the electrical power saving mode. In consequence, it is possible to avoid situations unnecessary to restore the operation mode to the normal mode, and entire power consumption of service hub 100 can be reduced.

Conventionally, an automatic responding software is required to perform communication with the externals, in a state in which when an operation mode of an image forming apparatus is an electrical power saving mode. The automatic responding software should be updated in response to a change of network protocol to be used. According to the above mentioned embodiment, server circuit 30 in an energized state transmits, receives, or refers to data relevant to the behavior of MFP circuit 20. Hence, it is unnecessary to update the automatic responding software.

When the operation mode is the electrical power saving mode and in a state in which processing load of main CPU 31 (server circuit 30) is large, service hub 100 starts up MFP circuit 20, by restoring the operation mode to the normal mode, so that a part of jobs is relegated to main CPU 21 (MFP circuit 20). Herewith, process capacity of main CPU 31 is supported, so that required jobs can be quickly completed.

Further, since same network interface circuit 35, same facsimile interface circuit 36, and so on can be used by MFP circuit 20 and server circuit 30, the number of components can be reduced, and miniaturization of the apparatus can be attained.

According to this embodiment, an image forming apparatus which can reduce power consumption and a control program for an image forming apparatus can be provided.

OTHERS

The processes in the above-mentioned embodiments can be performed by software and a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to a device via communication lines like the internet. The processes explained in the above flowcharts and the description are executed by a CPU in line with the program.

Although the present invention has been described and illustrated in detail, it is clearly understood that the same is by way of illustrated and example only and is not to be taken by way limitation, the scope of the present invention being interpreted by terms of the appended claims.

What is claimed is:

1. An image forming apparatus comprising:
   a hardware circuit for image forming, which includes an image forming unit to form images and an image forming control unit to control the image forming unit, and
   a hardware circuit for communication, which includes a communication unit to perform communication with external devices and a communication control unit to control the communication unit, wherein
   both the circuit for image forming and the circuit for communication have a common IP (Internet Protocol) address as an IP address published to users of the image forming apparatus, and
   the circuit for communication further includes an electric power control unit to control electric power supply to the circuit for image forming and electric power supply to the circuit for communication, being independent of each other.

2. The image forming apparatus according to claim 1, wherein
   the electric power control unit includes:
   a condition determination unit to determine whether a predetermined condition is satisfied or not, in a state an operation mode which indicates a providing state of electric power to the circuit for image forming is a first mode, and
   a low electric power moving unit to move the operation mode to a second mode, when the condition determination unit determined that the predetermined condition is satisfied, wherein
   the predetermined condition is at least one of a condition in which the circuit for image forming does not work during a required time, and a condition in which the circuit for image forming does not receive an operation request during a required time, and electric power supplied to the circuit for image forming in a state in which the operation mode is the second mode is smaller than electric power supplied to the circuit for image forming in a state in which the operation mode is the first mode.

3. The image forming apparatus according to claim 2, wherein
the electric power control unit includes a first restore unit to move the operation mode to the first mode in at least of one of a case when an operation to an operation unit which receives operations to the image forming apparatus is detected, opening or closing of a cover which realizes an open state in which an inner part of a chassis which stores the circuit for image forming and the circuit for communication is exposed and a close state in which the inner part of the chassis is covered is detected, an external device is connected to a connection interface which is a hardware interface to connect external devices with respect to the image forming apparatus, and a document to be read is placed on a document tray in a document feeding device, in a state in which the operation mode is the second mode.

4. The image forming apparatus according to claim 2, wherein
the electric power control unit includes a second restore unit to move the operation mode to the first mode, when a restore request from the communication control unit is received, in a state in which the operation mode is the second mode.

5. The image forming apparatus according to claim 4, wherein
the communication control unit includes
a CPU (Central Processing Unit),
a restore request unit to transmit a restore request to the electric power control unit, when load of the CPU is more than or equal to a predetermined amount, in a state in which the operation mode is the second mode,
a job determination unit to determine a relegation process to the image forming control unit among jobs to be executed by the CPU, when the load of the CPU is more than or equal to the predetermined amount, in a state in which the operation mode is the second mode,
a confirmation unit to confirm startup of the image forming circuit, and
a relegate unit to relegate a process determined by the job determination unit to the image forming control unit, when the startup of the image forming circuit is confirmed by the confirmation unit, wherein
the second restore unit moves the operation mode to the first mode, when the restore request from the restore request unit is received, and
the low electric power moving unit further moves the operation mode to the second mode, when a completion notice of the process determined by the job determination unit is received from the image forming circuit.

6. The image forming apparatus according to claim 5, wherein
the job determination unit excludes front-end processes and back-end processes of jobs from the processes to be relegated to the image forming control unit, and determines processes other than the front-end processes and the back-end processes of jobs as the processes to be relegated to the image forming control unit.

7. The image forming apparatus according to claim 5, wherein
the circuit for communication further includes a subsidiary storage device to store the job data, and
the relegate unit moves or copies the job data which is relevant to the processes to be relegated to the image forming control unit, to a storing area which can be accessed by the image forming control unit in the subsidiary storage device, when the job data which is relevant to the processes to be relegated to the image forming control unit is stored in a storing area which can not be accessed by the image forming control unit in the subsidiary storage device.

8. The image forming apparatus according to claim 7, wherein
the communication control unit further includes:
a data receiving unit to receive data relevant to behavior of the circuit for image forming transmitted from an external device, in a state in which the operation mode is the second mode, and
a data store unit to store the data received by the data receiving unit into a storing area which can be accessed by the image forming control unit, in the subsidiary storage device, wherein
the restore request unit does not transmit the restore request to the electric power control unit, when the data receiving unit received the data.

9. The image forming apparatus according to claim 7, wherein
the communication control unit further includes an external data transmitting unit to transmit the data stored in the subsidiary storage device to an external device, in accordance with a request from the external device, in a state in which the operation mode is the second mode, and
the restore request unit does not transmit the restore request to the electric power control unit, when the external data transmitting unit transmits the data.

10. The image forming apparatus according to claim 7, wherein
the image forming control unit includes
an inner part data transmitting unit to transmit data which should be stored in the subsidiary storage device to the communication control unit, and
an inner part data request unit to request the communication control unit to transmit the data stored in the subsidiary storage device, wherein
the communication control unit further includes:
an inner part data storing unit to store the data received from the data transmitting unit in the subsidiary storage device,
a completion notice unit to transmit a store completion notice to the image forming control unit, when the inner part data storing unit completes data storing in a normal way,
a store error notification unit to transmit a store error notification to the image forming control unit, when the inner part data storing unit can not complete data storing in a normal way,
an inner part data transmitting unit to transmit data requested by the inner part data request unit to the image forming control unit, when a request for transmitting data is received from the inner part data request unit, and
a transmitting error notification unit to transmit a transmitting error notification to the image forming control unit, when the inner part data transmitting unit can not complete transmitting data in a normal way.

11. The image forming apparatus according to claim 2, wherein the second mode is to shut off electric power provided to the circuit for image forming.

12. The image forming apparatus according to claim 11, wherein
default of the operation mode is the second mode.

13. The image forming apparatus according to claim 2, wherein
electric power supplied to the circuit for communication is not changed between the first mode and the second mode.

14. A non-transitory computer-readable recording medium storing a controlling program for an image forming apparatus, wherein
the image forming apparatus comprises:
a hardware circuit for image forming, which includes an image forming unit to form images and an image forming control unit to control the image forming unit, and
a hardware circuit for communication, which includes a communication unit to perform communication with external devices and a communication control unit to control the communication unit, wherein
both the circuit for image forming and the circuit for communication have a common IP (Internet Protocol) address as an IP address published to users of the image forming apparatus, and
the circuit for communication further includes an electric power control unit to control electric power supply to the circuit for image forming and electric power supply to the circuit for communication, being independent of each other, wherein the program causing a computer to:

determine whether a predetermined condition is satisfied or not, in a state an operation mode which indicates a providing state of electric power to the circuit for image forming is a first mode, and move the operation mode to a second mode, when the predetermined condition is satisfied, wherein the predetermined condition is at least one of a condition in which the circuit for image forming does not work during a required time, and a condition in which the circuit for image forming does not receive an operation request during a required time, and electric power supplied to the circuit for image forming in a state in which the operation mode is the second mode is smaller than electric power supplied to the circuit for image forming in a state in which the operation mode is the first mode.

\* \* \* \* \*